US009313699B2

(12) United States Patent
Kim et al.

(10) Patent No.: US 9,313,699 B2
(45) Date of Patent: Apr. 12, 2016

(54) METHOD FOR HANDOVER FROM HOME CELL TO PUBLIC CELL IN MOBILE COMMUNICATION SYSTEM

(75) Inventors: Hye-Jeong Kim, Suwon-si (KR); Yang-Ick Joo, Seoul (KR)

(73) Assignee: Samsung Electronics Co., Ltd (KR)

( * ) Notice: Subject to any disclaimer, the term of this patent is extended or adjusted under 35 U.S.C. 154(b) by 1297 days.

(21) Appl. No.: 12/745,167

(22) PCT Filed: Nov. 26, 2008

(86) PCT No.: PCT/KR2008/006956
§ 371 (c)(1),
(2), (4) Date: May 27, 2010

(87) PCT Pub. No.: WO2009/069934
PCT Pub. Date: Jun. 4, 2009

(65) Prior Publication Data
US 2010/0309887 A1     Dec. 9, 2010

(30) Foreign Application Priority Data

Nov. 28, 2007  (KR) .................. 10-2007-0121876

(51) Int. Cl.
*H04W 4/00*     (2009.01)
*H04W 36/00*    (2009.01)
(Continued)

(52) U.S. Cl.
CPC .......... *H04W 36/0077* (2013.01); *H04W 36/30* (2013.01); *H04W 84/045* (2013.01)

(58) Field of Classification Search
CPC ... H04L 5/0035; H04L 5/0055; H04L 5/0057; H04L 12/2869; H04L 12/5695; H04L 47/00; H04L 47/70; H04L 47/78; H04L 47/821; H04L 47/827; H04W 72/04
USPC ......... 370/203, 204–215, 229–240, 310–337, 370/395.3, 395.4, 395.41, 395.42, 395.5, 370/395.52, 431–457, 458–463, 464–497, 370/498–522, 523–520, 521–529
See application file for complete search history.

(56) References Cited

U.S. PATENT DOCUMENTS 8,046,020 B2 * 10/2011 Lee et al. .................. 455/522
2004/0185851 A1 * 9/2004 Nagai ....................... 455/436
(Continued)

FOREIGN PATENT DOCUMENTS

EP         1 753 252 A1    2/2007
KR  10-1999-0051784 A     7/1999
(Continued)

OTHER PUBLICATIONS

Written Opinion of the Int'l Searching Authority (Form PCT/ISA/237) (3 pages).
(Continued)

*Primary Examiner* — Jung-Jen Liu
(74) *Attorney, Agent, or Firm* — The Farrell Law Firm, P.C.

(57) ABSTRACT

A method for a connection mode terminal to hand over between a home cell and a public cell in a mobile communication system is provided. In the mobile communication system including the home cell and the public cell, a region of the terminal is determined and a random access channel for the handover is pre-allocated. When the normal handover from the home cell to the public cell fails, the access to the public cell is accomplished using the pre-allocated random access channel. Therefore, the handover failure rate can be lowered.

8 Claims, 8 Drawing Sheets

(51) Int. Cl.
*H04W 36/30* (2009.01)
*H04W 84/04* (2009.01)

(56) References Cited

U.S. PATENT DOCUMENTS

| | | | |
|---|---|---|---|
| 2007/0270152 A1* | 11/2007 | Nylander et al. | 455/445 |
| 2007/0293224 A1* | 12/2007 | Wang et al. | 455/436 |
| 2008/0261600 A1* | 10/2008 | Somasundaram et al. | 455/436 |
| 2008/0267127 A1* | 10/2008 | Narasimha et al. | 370/331 |
| 2008/0268893 A1* | 10/2008 | Lee et al. | 455/522 |
| 2009/0042594 A1* | 2/2009 | Yavuz et al. | 455/522 |
| 2009/0086671 A1* | 4/2009 | Pelletier et al. | 370/329 |
| 2009/0092096 A1* | 4/2009 | Czaja et al. | 370/331 |
| 2009/0092122 A1* | 4/2009 | Czaja et al. | 370/350 |
| 2009/0129341 A1* | 5/2009 | Balasubramanian et al. | 370/331 |
| 2010/0195640 A1* | 8/2010 | Park et al. | 370/350 |
| 2010/0309887 A1* | 12/2010 | Kim et al. | 370/332 |
| 2010/0330994 A1* | 12/2010 | Matsuo et al. | 455/436 |
| 2011/0105121 A1* | 5/2011 | Kazmi et al. | 455/436 |
| 2011/0275374 A1* | 11/2011 | Narasimha et al. | 455/436 |

FOREIGN PATENT DOCUMENTS

| | | |
|---|---|---|
| KR | 1020010017137 | 3/2001 |
| KR | 1020010026036 | 4/2001 |
| KR | 1020020093322 | 12/2002 |
| KR | 1020120111581 | 10/2012 |

OTHER PUBLICATIONS

Korean Office Action dated Feb. 3, 2015 issued in counterpart application No. 10-2007-0121876.

* cited by examiner

METHOD FOR HANDOVER FROM HOME CELL TO PUBLIC CELL IN MOBILE COMMUNICATION SYSTEM

TECHNICAL FIELD

The present invention relates generally to a mobile communication system. More particularly, the present invention relates to a handover of a terminal between a home cell and a public cell in a connection mode in a Long Term Evolution (LTE) system.

BACKGROUND ART

UMTS system is a $3^{rd}$ asynchronous mobile communication system using Wideband-Code Division Multiple Access (W-CDMA) based on Global System for Mobile Communications (GSM) and General Packet Radio Services (GPRS), which are mobile communication systems in Europe.

The 3rd Generation Partnership Project (GPP), which is standardizing the UMTS, is discussing a Long Term Evolution (LTE) system as a next generation mobile communication system of the UMTS system.

Aiming to commercialization in about 2010, the LTE realizes a high speed packet based communication at a data rate of 100 Mbps at maximum. To this end, diverse schemes are under consideration such as a method for reducing the number of nodes in a communication path by simplifying a network configuration and a method for making wireless protocols close to a radio channel.

Figure 1:
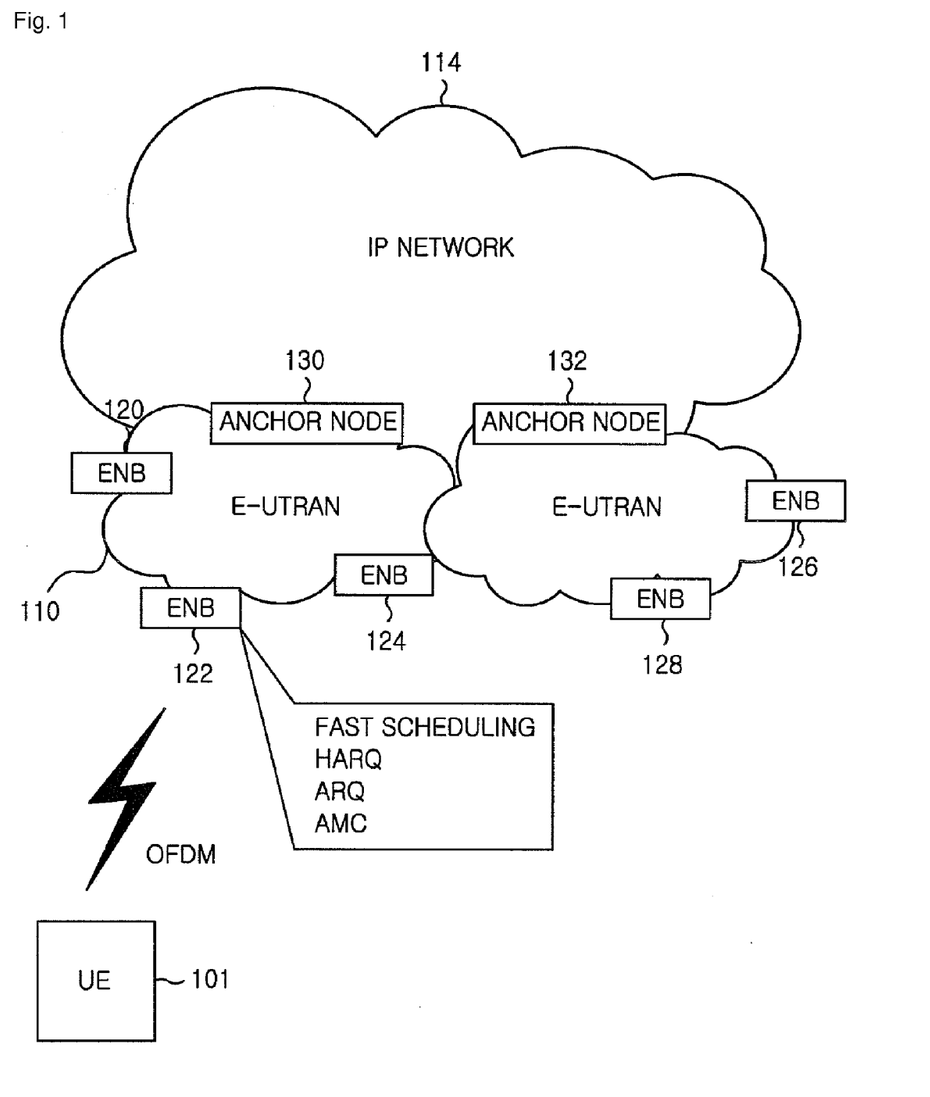
FIG. 1 illustrates an Evolved UMTS mobile communication system.

FIG. 1 illustrates an evolved UMTS mobile communication system.

In FIG. 1, the Evolved UMTS Radio Access Network (E-UTRAN) 110 is simplified to a two-node structure including evolved Node Bs (eNBs) 120, 122, 124, 126 and 128, and anchor nodes 130 and 132.

A User Equipment (UE) or a terminal 101 accesses to an Internet Protocol (IP) network over the E-UTRAN 110.

The eNBs 120 through 128 correspond to Node Bs of the UMTS system and are connected to the UE 101 over radio channels. Unlike the Node B, the eNBs 120 through 128 conduct more complicated functions. In the LTE, every user traffic including real-time services such as Voice over IP (VoIP) using the IP is serviced in a shared channel. The eNBs 120 through 128 are responsible to aggregate and schedule status information of the UEs.

One eNB usually controls a plurality of cells. The eNB performs an Adaptive Modulation and Coding (AMC) which determines a modulation scheme and a channel coding rate based on the channel status of the terminal.

Similar to High Speed Downlink Packet Access (HSDPA) and High Speed Uplink Packet Access (HSUPA) (or Enhanced Dedicated Channel (E-DCH) of the UMTS, Hybrid Automatic Repeat reQuest (HARQ) is performed between the eNB 120 through 128 and the UE 101. Since merely the HARQ cannot satisfy requirements of various Quality of Services (QoSs), an outer ARQ at an upper layer may be carried out between the terminal 101 and the eNB 120 through 128.

The HARQ raises the reception success rate by soft-combining the previously received data with the retransmitted data. The HARQ is used to increase the transmission efficiency in high-speed packet communications such as HSDPA and EDCH.

To realize the data rate of 100 Mbps maximum, it is expected that the LTE adopts Orthogonal Frequency Division Multiplexing (OFDM) in the bandwidth of 20 MHz.

Figure 2:
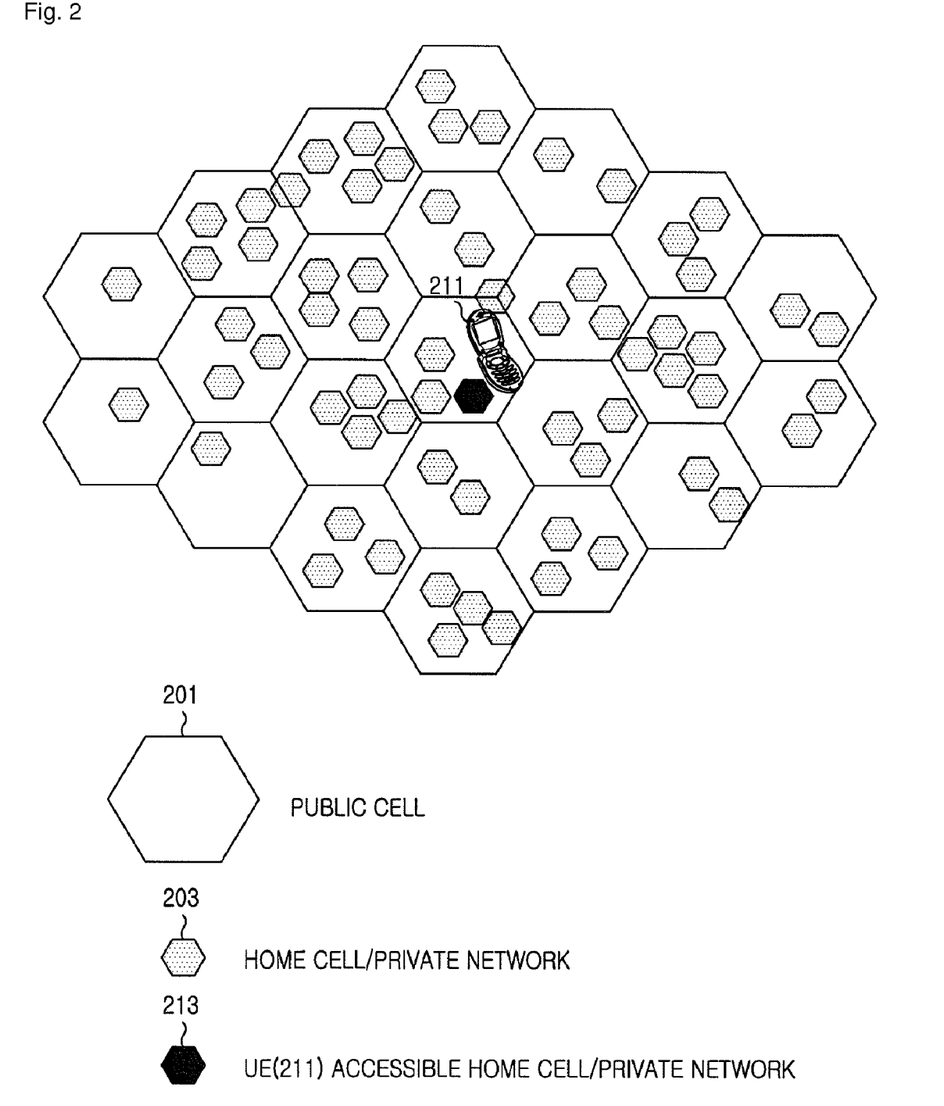
FIG. 2 illustrates a home cell deployment.

FIG. 2 illustrates a home cell deployment.

In FIG. 2, it is assumed that a public cell 201 covers several to tens of kilometers and a home cell 203 covers merely several to tens of meters. The home cells may include a home cell 213 which allows only a particular UE 211 to access.

The public cell 201 determines a measurement period and a handover process by taking into account a time taken for the UE to move to another cell and a cell overlapping area.

When the UE moves from the home cell to the public cell, because of a small radius of the home cell, within a shorter time than required for the measurement and the handover, the normal handover is not carried out. As a result, the call may be disconnected over a certain time, data may be lost, or system fail may be caused.

To avoid those problems, it is necessary to shorten the measurement period and to simplify the handover process. Currently, since the home cell and the public cell use different Frequency Assignments (FAs), gaps for the measurement need to generate frequently.

However, since the data cannot be transmitted or received during the measurement, the performance is subject to degradation. In addition, when loose handover conditions lead to too many unnecessary handovers, resources are wasted and the performance is degraded.

DISCLOSURE OF INVENTION

Technical Solution

An aspect of the present invention is to address at least the above mentioned problems and/or disadvantages and to provide at least the advantages described below. Accordingly, an aspect of the present invention is to provide a handover method from a home cell to a public cell in a mobile communication system.

Another aspect of the present invention is to provide a handover method of a terminal from a home cell to a public cell in a Long Term Evolution (LTE) system.

Yet another aspect of the present invention is to provide a handover method for minimizing performance degradation and handover failure when a terminal hands over from a home cell to a public cell in an LTE system.

The above aspects are achieved by providing a method for a terminal to determine a region in a mobile communication system which comprises a home cell and a public cell. The method includes measuring a home cell signal and public cell signals using a measurement period; setting a public cell having the greatest signal among signals measured in the public cells, as a max cell; determining that the terminal locates in a first region when the measured home cell signal is greater than a first threshold (a threshold 1) and greater than the max cell signal by more than a third threshold (a threshold 2); and determining that the terminal locates in a second region when the measured home cell signal is less than the first threshold (the threshold 1) and the max cell signal is greater than a second threshold (a threshold 3).

According to one aspect of the present invention, a method for setting a Random Access Channel (RACH) in a mobile communication system which comprises a home cell and a public cell, includes checking a change of a region of a terminal; determining whether the terminal locates in an overlapping region and whether a max public cell is changed, and releasing an RACH channel to a previous max public cell when the max public cell is changed; releasing an RACH channel to the max public cell when the terminal locates in a home cell dominant region; and requesting an RACH setup to the max public cell when the terminal is in the overlapping region, not in the home cell dominant region, and the RACH of the max public cell is not set, is provided.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures.

BEST MODE FOR CARRYING OUT THE INVENTION

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a $3^{rd}$ Generation Partnership Project (3GPP) Long Term Evolution (LTE) which is a next-generation communication system discussed by the 3GPP.

According to the present invention, a connection mode UE in a home cell periodically measures a signal strength in the home cell and public cells. When the signal strength satisfies a particular condition, the UE is allocated a RACH from the public cell by signaling to the home cell.

When the normal handover fails as migrating from the home cell to the public cell which allocated the RACH, the UE uses the allocated RACH to transmit a preamble for the handover to the public cell.

Since the coverage of the home cell is much smaller than the public cell, when the UE locates outside the connected cell or in a boundary area between the public cell and the home cell and the UE applies the same measurement and handover schemes as in the public cell, a time requirement is not satisfied and the system is highly likely to fail.

That is, a sufficient time may not be given to the UE, which leaves the home cell at a high speed, to measure, to request the handover of the home cell, to request the handover of the target cell, and to perform a series of handover procedures including a handover command.

In addition, since the ranking of the signal strengths of the public cell and the home cell is frequently changed in the boundary area, it is not easy to determine the handover. More specifically, under a tight handover condition, the UE is likely to frequently hand over even in the boundary area and thus resources are wasted. Under a loose handover condition, it is not easy to immediately handle the UE leaving the boundary area and the system fail is highly likely to occur.

According to the present invention, with a specific condition satisfied, when a Random Access Channel (RACH) for the handover is allocated in advance and the normal handover from the home cell to the public cell fails, the UE accesses the public cell using the pre-allocated RACH.

When the public cell receives the preamble in the pre-allocated RACH without the normal handover procedures, the public cell enables to complete the normal handover through procedures required for the handover, which is explained in more detail.

The UE in the connection mode within the home cell measures neighbor public cells and examines the possibility of the handover using information such as a public cell signal magnitude, a home cell signal strength, a difference of the public cell signal strength, and a public cell signal stability. When the possibility exceeds a certain threshold, the UE informs the home cell of the information using a measurement message.

The home cell requests the RACH allocation for the handover to the public cell having the greatest and stable signal strength based on the information received from the UE. The public cell, receiving the request, allocates a dedicated RACH or a reserved RACH depending on a network operation status.

The home cell informs the UE of the allocated RACH. When the UE releases the connection still in the home cell or the handover possibility falls below the threshold over a certain time, the home cell requests to release the allocated RACH.

When the UE measures a public cell having the greater and more stable signal strength than the public cell allocated RACH, the UE releases the allocated RACH and requests the RACH allocation to the new public cell.

When the UE cannot perform the normal handover; that is, when the UE leaves the home cell coverage (a personal network cell) even before the handover request or the handover command and cannot communicate with the home cell, the UE transmits the preamble to the public cell allocated the RACH using the allocated RACH.

Upon receiving the preamble over the RACH allocated to the home cell, the public cell informs the home cell of the handover and the home cell enables the seamless communication in the connection by forwarding data.

Figure 3:
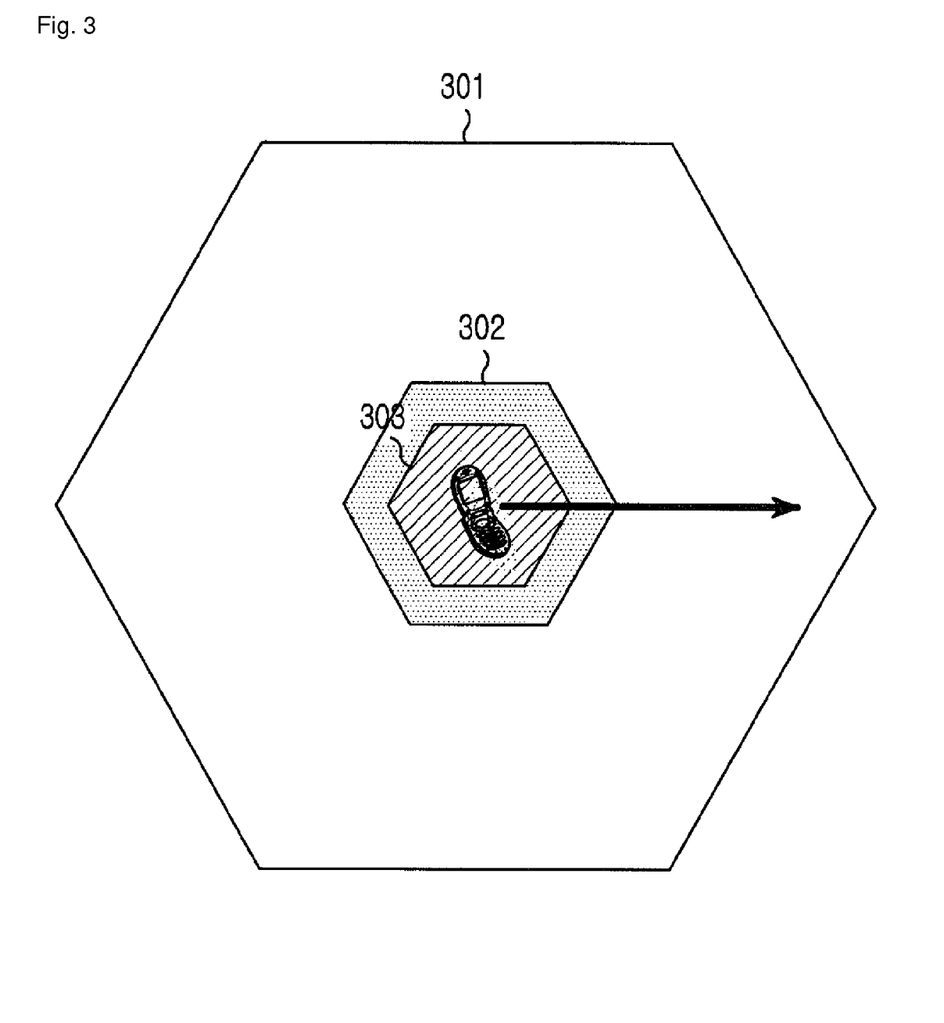
FIG. 3 illustrates a home cell in a public cell, a region separation based on a signal magnitude of the public cell and the home cell, and a path of a UE moving from the home cell to the public cell according to an exemplary embodiment of the present invention.

FIG. 3 illustrates a home cell in a public cell, a region separation based on a signal magnitude of the public cell and the home cell, and a path of a UE moving from the home cell to the public cell according to an exemplary embodiment of the present invention.

In FIG. 3, the reference numeral 303 indicates a region where the home cell signal is dominant, the reference numeral 302 indicates an overlapping region where both the home cell signal and the public cell signal are received, and the reference numeral 301 indicates a region where the home cell signal is not received and only the public cell signal is received.

For instance, in case of a private residence, the inside of the house can be the region where the home cell signal is dominant, a garden outside the house can be the overlapping region, and the outside of the house can be the public cell region.

When the connection mode UE locates within the region of the dominant home cell signal or migrates from the region of the dominant home cell signal to the overlapping region, it is expected that its movement speed is not so high. By contrast, as migrating from the overlapping region to the public cell region, the movement speed can be fastened depending on the moving means.

The first embodiment of the present invention relates to the measurement of the UE to request the RACH allocation. Although the first embodiment assumes that the home cell receives public network information around the home cell every time the home cell is set up or on a periodical basis and informs the UE of the minimum neighbor public cell information for the handover to the public cell, the UE may acquire the neighbor public cell information through the search without receiving the neighbor cell information.

After the UE measures the home cell and the neighbor public cells, when the home cell signal magnitude is greater than a specific threshold 1 and the home cell signal is greater than the greatest public cell signal of the public cells by a specific threshold 2, the UE determines that it belongs to the region where the home cell signal is dominant. Hereinafter, the public cell signal is the greatest public cell signal among the public cells.

By contrast, when the home cell signal magnitude is greater than the threshold 1 and the magnitude difference of the home cell signal and the public cell signal is less than the threshold 2 and when the home cell signal magnitude is less than the threshold 1 and the public cell signal magnitude is greater than a threshold 3, the UE determines the overlapping region.

When the home cell signal magnitude is less than the threshold 1 and the public cell signal magnitude is less than the threshold 3, the UE determines the overlapping region, which is an exceptional case where it is hard to hand over to the public cell.

When the home cell signal magnitude is less than the threshold 3 over a certain time, the UE determines a radio link failure and performs the process for the radio link failure.

When the UE stays in the overlapping region, the signal magnitude ranking of the public cells is changed, and the same ranking is maintained over a certain time duration, the representative public cell is changed to the public cell having the greater signal magnitude.

Herein, the threshold 1 can be defined to an average signal strength value expected when the UE locates around a base station of the home cell. The threshold 1 can vary depending on a provider who manages the home cell in the phase of the network design.

The threshold 2 is the difference between the home cell signal and the greatest public cell signal when the UE locates around the base station of the home cell. The value of the threshold 2 can be defined in the home cell deployment based on the position of the home cell in the network design phase.

The threshold 3 indicates a minimum signal strength communicable by the UE. The home cell can receive the threshold information from the public cell and forward the threshold information to the UE, or the UE can arbitrarily define the thresholds when a standard relating to the power of the home cell and the public cell is determined.

The public cell measurement period relies on the position of the UE. Determining the region of the dominant home cell signal, the UE measures the public cells using a second period. Determining the overlapping region, the UE uses a third period.

The second period can be set to longer than the third period. The home cell can signal the setting of the second period and the third period to the UE, or the UE can flexibly set the second period and the third period depending on situations.

Upon entering the public cell region, the UE follows the measurement and handover procedures of the public cell.

In the exceptional case where the home cell signal magnitude is less than the threshold 1 and the public cell signal magnitude is less than the threshold 3, the UE more frequently measures at a fourth period which is shorter than the second period and the third period.

The latest measurement value is not taken but measurement values of the past are weighted and averaged. Hence, the stability of the corresponding signal can be fully ensured by not directly taking the instantaneous value.

To avoid ping-pong between the region of the dominant home cell signal and the overlapping region, the UE determines whether to move the region using a timer. In the overlapping region, the signal magnitude of the public cells may differ.

Figure 4:
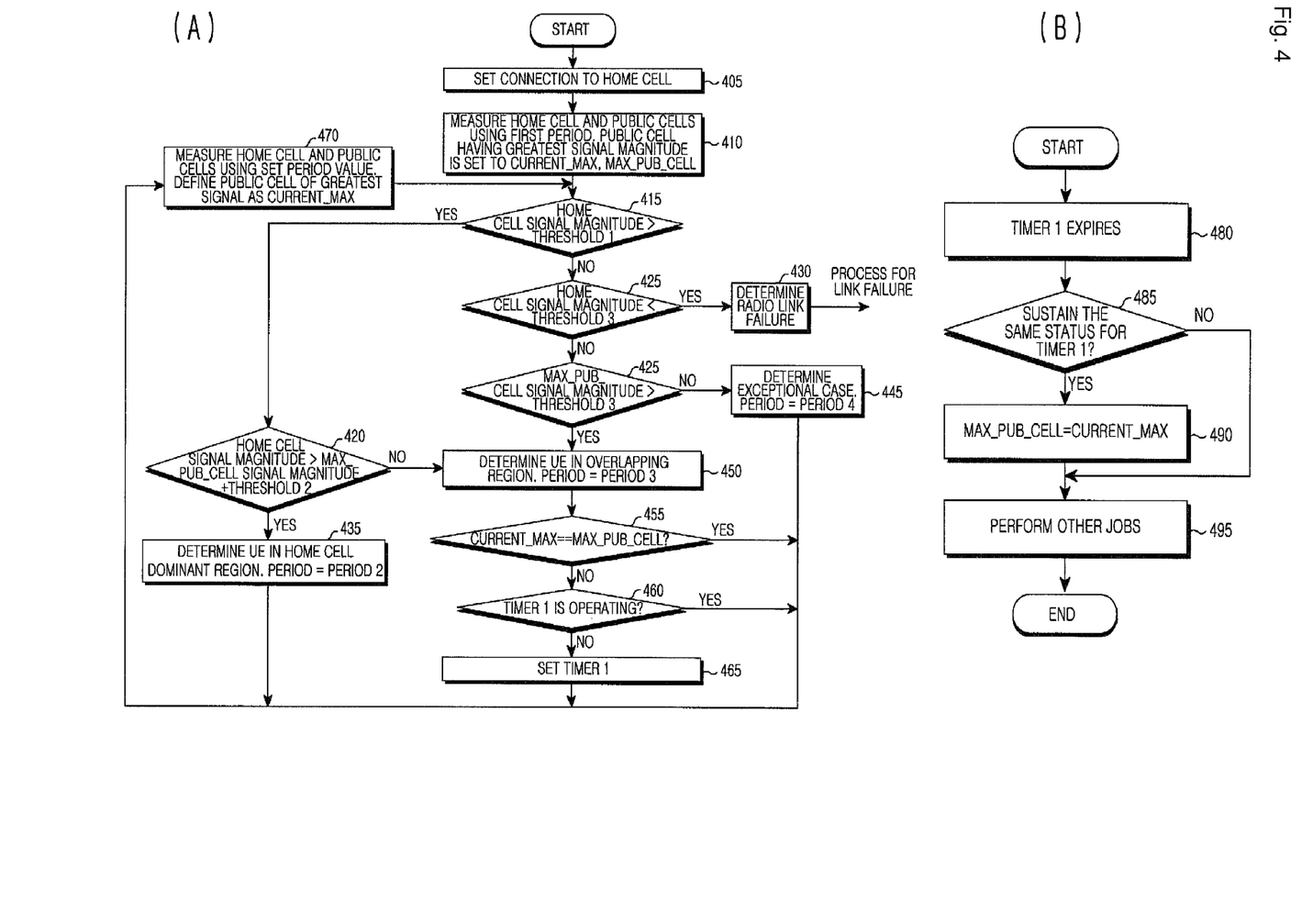
FIG. 4 is a flowchart of the terminal according to a first exemplary embodiment of the present invention.

FIG. 4 is a flowchart of the terminal according to the first exemplary embodiment of the present invention.

After the measurement, the UE distinguishes the current region by comparing the condition relating to the home cell signal and the greatest public cell signal magnitude, and defines the measurement period for each region.

When the ranking of the public cells is changed, the UE drives the first timer. The same ranking is maintained until the first timer expires, the UE updates max_pub_cell with the public cell of the greatest signal magnitude.

Although it is not illustrated in FIG. 4, when current_max cell is changed, the UE stops the first timer and drives a new first timer.

Now referring to FIG. 4A, the UE sets the connection to the home cell in step 405 and measures the home cell and the public cells at the first period. Herein, the public cell having the greatest signal magnitude is set to current_max, max_pub_cell in step 410.

When the signal magnitude of the measured home cell is greater than the threshold 1 in step 415, the UE checks whether the home cell signal magnitude is greater than "signal magnitude of max_pub_cell+threshold 2" in step 420.

When the home cell signal magnitude is greater than "signal magnitude of max_pub_cell+threshold 2", the UE determines the region of the dominant home cell and sets the period to the second period in step 435.

Next, the UE measures the home cell and the public cells using the set period value and defines the public cell of the greatest signal as current_max in step 470.

When the measured home cell signal magnitude is not greater than the threshold 1 in step 415, the UE checks whether the measured home cell signal magnitude is less than the threshold 3 in step 425.

When the measured home cell signal magnitude is less than the threshold 3 in step 425, the UE determines the radio link failure in step 430 and performs the process for the radio link failure.

When the measured home cell signal magnitude is greater than the threshold 3 in step 425, the UE checks whether the max_pub_cell signal magnitude is greater than the threshold 3 in step 440.

When the max_pub_cell signal magnitude is not greater than the threshold 3 in step 440, the UE determines the exceptional case and sets the period to the fourth period in step 445.

When the max_pub_cell signal magnitude is greater than the threshold 3 in step 440, the UE determines the overlapping region and sets the period to the third period in step 450.

Next, when the current_max cell is the max_pub_cell in step 455, the UE measures the home cell and the public cells at the set period and defines the public cell of the greatest signal strength to the current_max in step 470.

When the current_max cell is different from the max_pub_cell in step 455, the UE checks whether the first timer is operating. When the first timer is operating in step 460, the UE measures the home cell and the public cells at the set period and defines the public cell of the greatest signal strength to the current_max in step 470.

When the first timer is not operating in step 460, the UE sets the first timer in step 465 and measures the home cell and the public cells at the set period and defines the public cell of the greatest signal strength to the current_max in step 470.

When the home cell signal magnitude is not greater than "signal magnitude of max_pub_cell+threshold 2" in step 420, the UE determines the overlapping region and sets the period to the third period in step 450 and carries out the subsequent steps.

FIG. 4B illustrates the operations when the first timer expires. When the first timer expires in step 480, the UE checks whether the same status is sustained during the first timer. When the same status is maintained in step 485, the UE sets max_pub_cell to current_max cell in step 490. Next, the UE performs other jobs in step 495. When the same status is not maintained, the UE performs the other jobs in step 495.

The second embodiment of the present invention concerns how the UE requests the RACH allocation. When determining the overlapping region through the measurement, the UE signals the public cell information of the greatest signal strength and the RACH allocation request to the home cell through a measurement report.

The home cell reports information of the UE which requests the RACH allocation, reports home cell information, and requests the RACH allocation to the corresponding public cell. The corresponding public cell allocates the dedicated RACH or the reserved RACH to the corresponding UE depending on the resource status.

Each public cell manages a plurality of RACHs. For the asynchronous random access, the public cell separates part of the RACHs and broadcasts its information so that the UEs in the corresponding public cell can use the RACHs.

The other RACHs are allocated every time they are needed for the synchronous random access. Given not so many home cells in the corresponding public cell and not so many UEs in the home cell, the public cell can allocate the dedicated RACH to the corresponding UE upon every RACH allocation request from the UE of the home cell.

Conversely, when the RACH resources are not sufficient because of a number of home cells, a number of UEs in the home cell, or a number of UEs in the corresponding cell, some RACHs are reserved and allocated for the home cell UE so that the UEs in the home cell of the corresponding cell can commonly use.

The above-mentioned process is applied only when the home cell UE hands over or requests the RACH allocation via the home cell. In the public cell coverage, the normal process of the public cell is applied.

The RACH allocation to the UE in the home cell is limited to a case where the connection mode UE; that is, the UE in the data or voice communications migrates from the home cell signal dominant region to the overlapping region. Since it is expected that such a case will not frequently happen, load or resource consumption caused by the RACH allocation of the public cell will not be considerable.

When the resources are not sufficient and the preamble is received in the corresponding RACH allocated in common, the UE in the home cell can be determined and the corresponding process can be performed.

When the UE in the home cell moves from the overlapping region to the home cell signal dominant region, the allocated RACH can be released. In this case, if the signaling can result the load, the RACH allocation may be sustained until the UE releases the connection.

Alternatively, both of the home cell UE and the public cell may automatically release the RACH allocation after a certain time using the timer. The home cell UE can request the RACH allocation again if necessary.

The RACH allocation request intends to allow the corresponding cell to perform the handover procedures when the corresponding UE accesses over the allocated RACH, through the fast access to the public cell in the handover failure and by informing the public cell of the home cell UE information in advance.

When the UE measures the signal of the second public cell having the greater signal strength than the first public cell allocated the RACH and the signal of the first public cell allocated the RACH exceeds a threshold, there is no need to release the existing RACH and to allocate a new RACH from the new second public cell.

When the signal of the first public cell falls below the threshold and the signal strength of the second public cell greater than the signal strength of the first public cell is sustained over a certain time duration, the UE releases the RACH allocated from the first public cell and requests the RACH allocation to the new second public cell.

Figure 5:
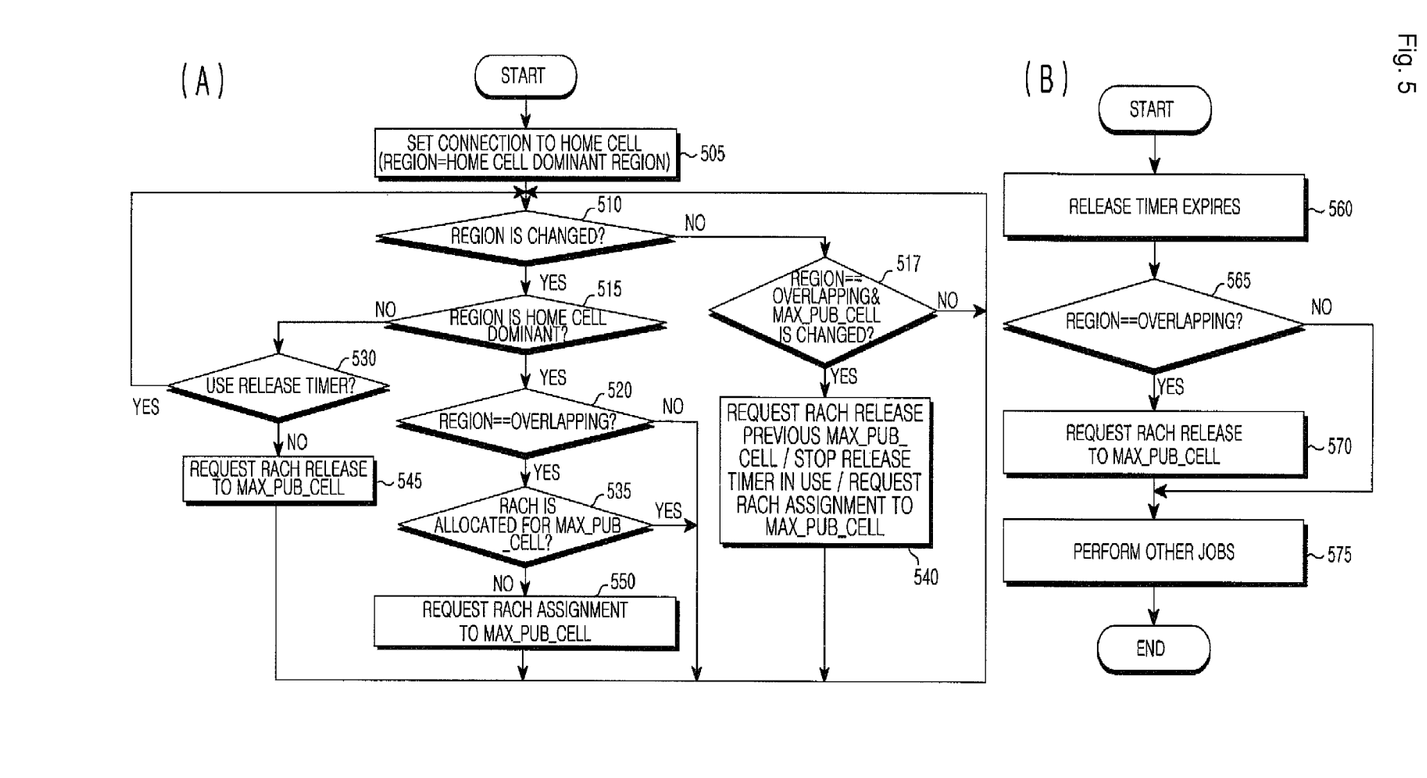
FIG. 5 is a flowchart of the terminal according to a second exemplary embodiment of the present invention.

FIG. 5 is a flowchart of the UE according to a second exemplary embodiment of the present invention.

The base station and the UE can automatically release the RACH allocation using a release timer after a certain time after the RACH allocation, or release the RACH by means of a release request.

Using the timer, when the timer expires and the UE locates in the overlapping region, the UE requests a new RACH allocation. When the public cell which is the maximum value (hereafter, referred to as a Max_pub_cell) is changed, the UE sends a release request for the existing RACH and requests the RACH allocation to the new Max_pub_cell.

Using the release timer, the UE stops the release timer. The release timer is driven upon being allocated the RACH.

In FIG. 5A, the UE sets the connection to the home cell in step 505. Herein, the UE is assumed to locate in the region of the dominant home cell signal.

When the UE migrates and the region of the UE is changed in step 510, the UE checks whether the changed region is the region of the dominant home cell signal in step 515. In the region of the dominant home cell signal in step 515, the UE checks whether it is the overlapping region in step 520.

In the overlapping region in step 520, the UE checks whether the RACH is allocated to the cell Max_pub_cell in step 535. When the RACH is not allocated to the cell Max_pub_cell in step 535, the UE requests the RACH allocation by sending an RACH assignment message to the cell Max_pub_cell in step 550. Next, the UE proceeds to check the region change in step 510.

When the RACH is allocated to the cell Max_pub_cell in step 535, the UE proceeds to check the region change in step 510.

When the UE does not move and the region of the UE is not changed in step 510, the UE checks whether the region is the overlapping region and whether the cell Max_pub_cell is changed in step 517. When the region is the overlapping region and the Max_pub_cell is changed in step 517, the UE requests the RACH release to the previous cell Max_pub_cell in step 540. Also, when the release timer is used, the release timer is stopped and the RACH allocation is requested by sending the RACH assignment message to the cell Max_pub_cell in step 540. Next, the UE proceeds to check the region change in step 510.

When the UE does not move and the region of the UE is not changed in step 510, the UE checks whether the region is the overlapping region and whether the cell Max_pub_cell is changed in step 517. When the region is not the overlapping region or the cell Max_pub_cell is not changed, the UE proceeds to check the region change in step 510.

The UE checks whether the changed region is the region of the dominant home cell signal in step 515. When the changed region is not the region of the dominant home cell signal in step 515, the UE checks whether the release timer is used or not in step 530. When the release timer is not used in step 530, the UE requests the RACH release to the cell Max_pub_cell in step 545.

When the release timer is utilized in step 530, the UE goes to check the region change in step 510.

FIG. 5B illustrates a case where the release timer is expired. When the release timer expires in step 560 and the region is the overlapping region in step 565, the UE requests the RACH release to the cell Max_pub_cell in step 570. Next, the UE performs other normal jobs in step 575.

Not in the overlapping region in step 565, the UE performs other general jobs in step 575.

The third embodiment of the present invention pertains to the handover using the RACH allocated in the normal handover failure when the UE migrates from the home cell to the public cell.

Because the coverage of the home cell is not so wide, the signal strength is likely to abruptly decrease in the cell boundary. As a result, when the UE leaves the home cell at a high speed or when the UE does not properly carry out the measurement, the handover request transmission after the measurement may fail or the handover command reception after the handover request transmission may fail.

In those cases, the connection is severed, the communication is suspended until the terminal establishes a new connection to the public cell, the call is disconnected, and the data loss is caused.

When the normal handover fails in the home cell, the UE allocated the RACH sends the preamble to the public cell which allocates the RACH, using the pre-allocated RACH. The corresponding public cell receives the preamble. When the corresponding RACH is the dedicated RACH, the public cell requests the handover information of the corresponding UE to the corresponding home cell.

Next, the corresponding home cell forwards the information and the data required for the handover to the corresponding public cell.

When the corresponding RACH is the reserved RACH, it is infeasible to distinguish the UE merely with the preamble. Thus, the corresponding public cell receives a handover confirm message, confirms a UE ID, and then requests handover information of the corresponding UE to the corresponding home cell.

The corresponding public cell sends "UL allocation+TA" to the corresponding UE. The UE sends a handover confirm message to the corresponding public cell using the allocated resource.

In the initial communication with the base station, the UE transmits the preamble using the RACH channel. The base station, which does not know the information of the UE transmitting the preamble, sends TA+allocation information over a control channel. The UE sends the confirm message using this information.

The present invention can achieve the substantially the same effect as the normal handover, except that the handover information is transmitted from the home cell to the public cell and the data forwarding start is delayed a little bit.

Figure 6:
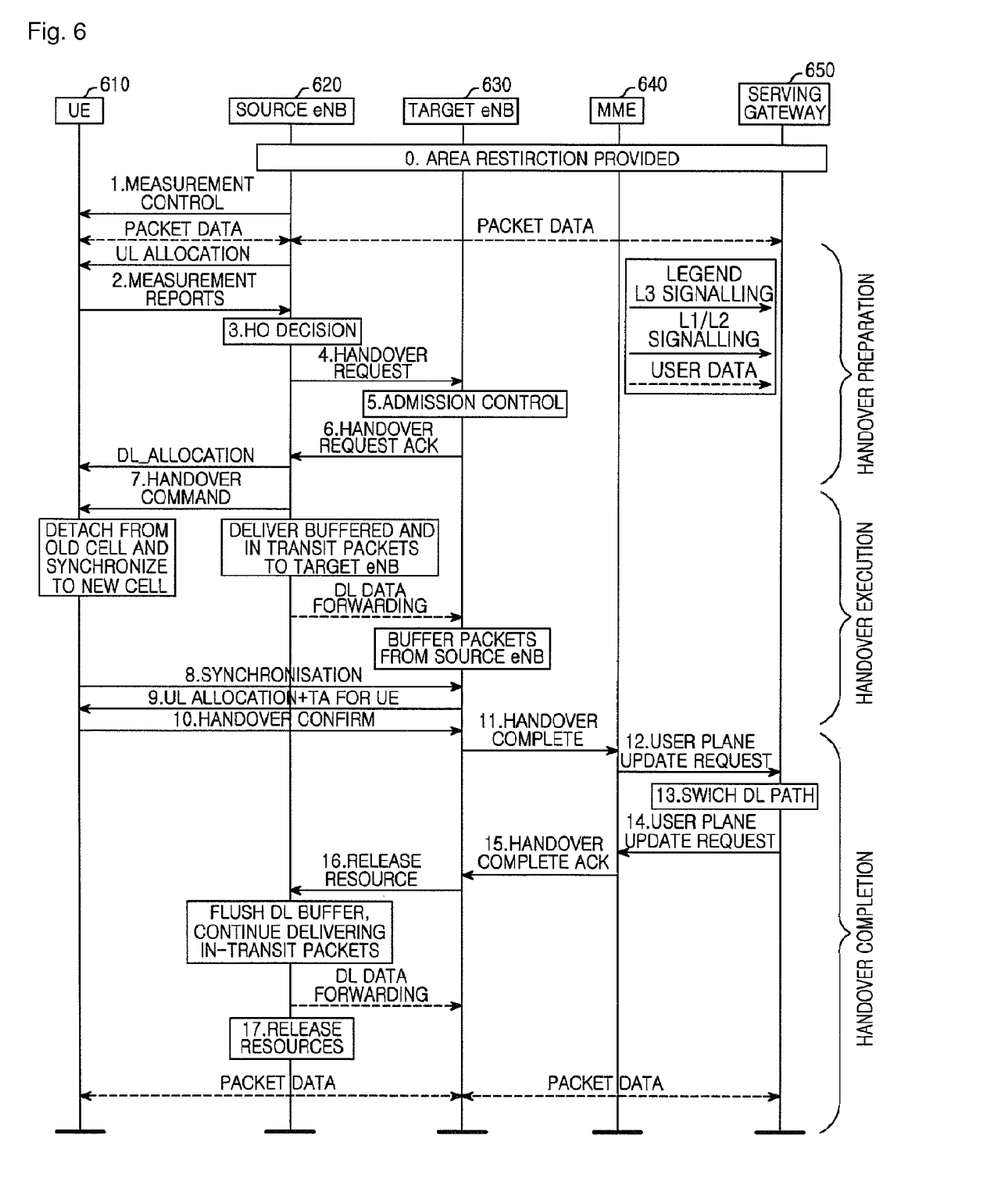
FIG. 6 illustrates message flows of the handover in case of measurement and RACH allocation request as described in the current 3GPP LTE standard, and a radio link failure.

FIG. 6 illustrates message flows of the handover in case of the measurement and the RACH allocation request as described in the current 3GPP LTE standard, and the radio link failure.

In FIG. 6, the UE 610 hands over from the source eNB 620 to the target eNB 630. The UE 610 performs the measurement in steps 1 and 2, and the eNB 620 determines the handover in step 3 and requests the handover to the target eNB 630 in step 4. When the handover is admitted in steps 5 and 6, the eNB 620 commands the handover to the UE 610 in step 7.

Next, the UE 610 performs negotiation for the handover with the target eNB 630 in steps 8, 9 and 10. When the handover is completed in step 11, the target eNB 630 reports the handover completion to anchor nodes 640 and 650 in steps 12, 13, 14 and 15 and releases the resource of the UE 610 with the source eNB 620 in steps 16 and 17.

Figure 7:
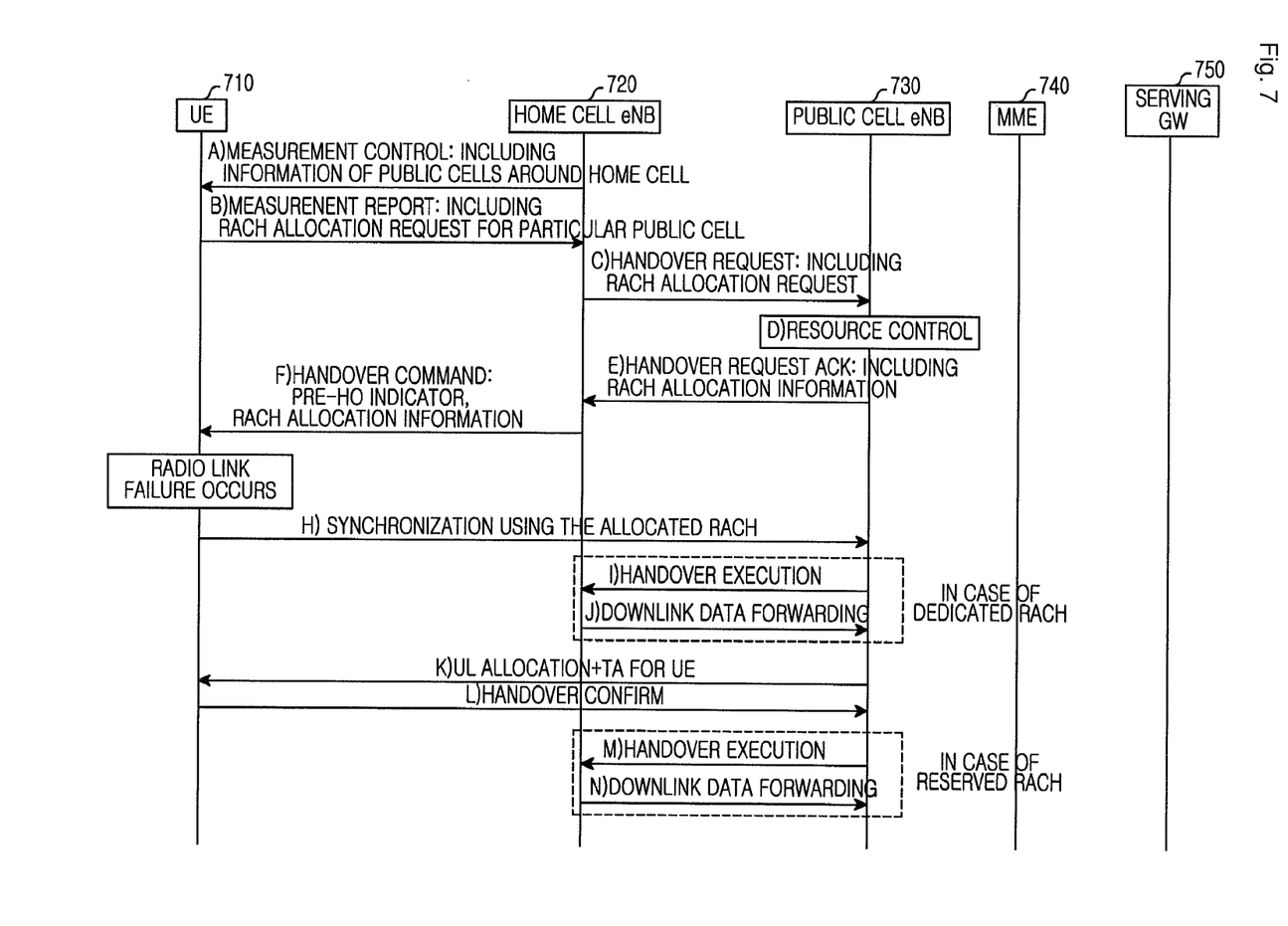
FIG. 7 illustrates message flows according to a third exemplary embodiment of the present invention.

FIG. 7 illustrates message flows according to the third exemplary embodiment of the present invention.

In FIG. 7, except for a handover execution message of the step i transmitted from the public cell to the home cell, a new field is added to the basic messages of FIG. 6 according to the third embodiment of the present invention. In doing so, the usage of the new message can be minimized.

The UE 710 hands over from the home cell eNB 720 to the public cell eNB 730. The UE 710 performs the measurement in steps a and b. The home cell eNB 720 determines the handover and requests the handover to the public cell eNB 730 in step c. When the handover is admitted in step d, the home cell eNB 720 commands the handover to the UE 710 in step f. The handover command includes the RACH allocation information.

When the radio link failure occurs in step g in use of the dedicated RACH, the UE 710 performs synchronization using the allocated RACH in step h. Next, the UE 710 and the public cell eNB 730 perform the handover in steps i and j.

When the reserved RACH is used instead of the dedicated RACH, the public cell eNB 730 acquires information of the UE 710 in steps k and l and performs the handover in steps m and n.

The message flows between the public cell eNB 730 and the anchor nodes 740 and 750 are the same as the existing message flows.

Figure 8:
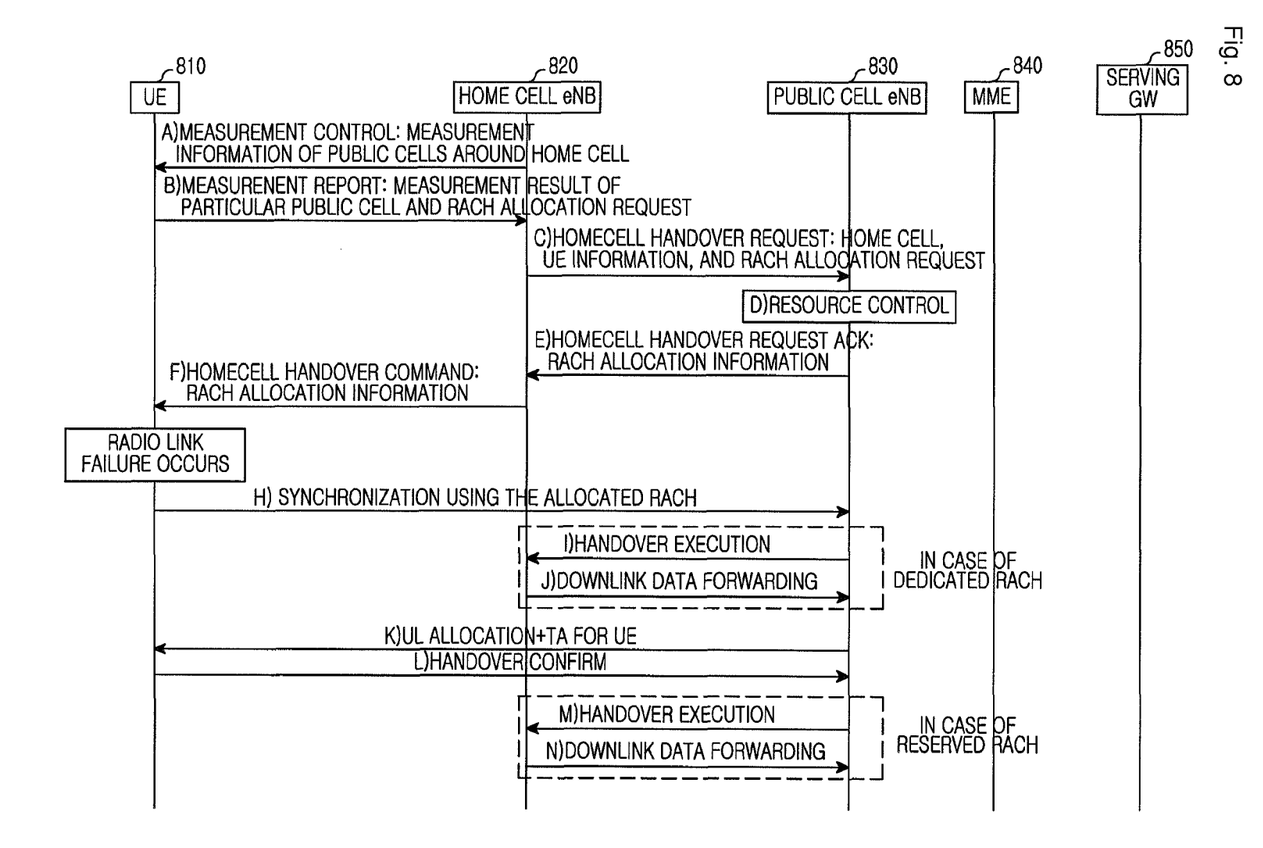
FIG. 8 illustrates a method for newly defining and using messages of the third exemplary embodiment of the present invention.

FIG. 8 illustrates a method for newly defining and using messages of the third exemplary embodiment of the present invention.

The messages in steps a through n of FIG. 7 are newly defined and used. The message flows between the public cell eNB 830 and the anchor nodes 840 and 850 are the same as the existing message flows.

After the RACH for the handover is allocated in advance, when the normal handover from the home cell to the public cell fails, the access to the public cell is accomplished using the pre-allocated RACH. Therefore, the handover failure rate can be lowered.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for a user terminal to determine a region in a mobile communication system which comprises a home cell and a public cell, the method comprising:

measuring, by the user terminal, a home cell signal and public cell signals during a measurement period;

setting a public cell having the greatest signal among signals measured in the public cells, as a max cell at the user terminal;

determining, by the user terminal, that the user terminal is located in a first region when the measured home cell signal is greater than a first threshold and greater than the max cell signal by more than a second threshold; and determining, by the user terminal, that the user terminal is located in a second region when the measured home cell signal is less than the first threshold and the max cell signal is greater than a third threshold.

2. The method of claim 1, further comprising:

determining, by the user terminal, that the user terminal is located in the second region when the received home cell signal is greater than the first threshold and a difference of the max cell signal and the home cell signal is less than the second threshold.

3. The method of claim 1, further comprising:

setting the measurement period to a second period when it is determined that the user terminal travels in the first region.

4. The method of claim 1, further comprising:

setting the measurement period to a third period when it is determined that the user terminal locates in the second region.

5. The method of claim 1, further comprising:

setting the measurement period to a fourth period when the measured max cell signal is less than the third threshold and the measured home cell signal is less than the first threshold.

6. The method of claim 1, further comprising:

determining a current state as a radio link failure when the measured home cell signal is less than the third threshold over a certain time.

7. The method of claim 1, wherein a determination of the first region denotes that the user terminal is located in a region where the home cell is dominant.

8. The method of claim 1, wherein a determination of the second region denotes that the user terminal is located in an overlapping region of the home cell and the public cell.

* * * * *